United States Patent [19]
Dolby

[11] 3,828,280
[45] Aug. 6, 1974

[54] COMPRESSORS, EXPANDERS AND NOISE REDUCTION SYSTEMS

[75] Inventor: Ray Milton Dolby, London, England

[73] Assignee: Dolby Laboratories Inc., New York, N.Y.

[22] Filed: May 1, 1973

[21] Appl. No.: 356,126

[30] Foreign Application Priority Data

May 2, 1972 Great Britain .................... 20406/72

[52] U.S. Cl. ........................ 333/14, 307/264, 325/65
[51] Int. Cl. ............................................ H04b 1/64
[58] Field of Search .................. 333/14; 325/62, 65; 179/100.2 K; 307/264

[56] References Cited

UNITED STATES PATENTS

| | | | |
|---|---|---|---|
| 2,193,966 | 3/1940 | Jones | 333/14 |
| 3,665,345 | 5/1972 | Dolby | 333/14 |
| 3,729,693 | 4/1973 | Dolby | 333/14 |

*Primary Examiner*—Paul L. Gensler
*Attorney, Agent, or Firm*—Dike, Bronstein, Roberts & Cushman

[57] ABSTRACT

The invention provides signal compressors, expanders and noise reduction systems. In the compressor, a linearly treated signal component has combined therewith in opposition a non-linearly treated signal component which is however linear with respect to dynamic range above a threshold. Below the threshold the non-linearly treated component has a gain which falls as the signal level falls. The expander is complementary to the compressor; the two signal components combine additively. The compressors and expanders are useful in video, audio and other circuits for effecting noise reduction.

39 Claims, 36 Drawing Figures

LIMITER

CONVEYOR

COMPRESSORS, EXPANDERS AND NOISE REDUCTION SYSTEMS

This invention relates to circuits which modify the dynamic range of an input signal — that is to say, signal compressors which compress the dynamic range and signal expanders which expand the dynamic range. Compressors and expanders are sometimes required to work independently of each other; more often, however, the compressor compresses the dynamic range of an input signal before the signal is transmitted or recorded. The complementary expander expands the dynamic range of the received signal or the signal played back from the recording — i.e. the expander restores the linearity of the dynamic range relative to the input signal. Noise introduced during transmission or the record/replay process is substantially reduced and the compressor-expander combination therefore acts as a noise reduction system.

A problem which exists with many dynamic range modification circuits for use in noise reduction systems is that they tend to distort or introduce level errors into high level signals; in a noise reduction system there is no need to modify high level signals, since noise usually has a low value relative to the maximum signal level. Thus compressors and expanders for such systems should be designed in such a way that manipulations of signal dynamics are eliminated at high levels and are confined only to low levels. This can be achieved by the use of a general class of circuits, for producing an output signal in a specified frequency band in response to an input signal in this band and having, at any given frequency in the band, an input-output transfer characteristic which is divided into two regions comprising low and high levels, in which at least the high level region has transfer characteristics determined only by fixed circuit elements providing substantially linear transfer characteristics which on a decibel plot are parallel to but displaced from those of the low level region, the transition from the low level region to the high level region being effected by variable circuit means, the parameters of which are variable in response to the levels of one or more signals in the circuit, the said parameters passing to an extreme condition in effecting the transition from the low level region to the high level region, whereby in the high level region any variations and imperfections in the parameters have an insignificant influence on the transfer characteristic and the output signal.

Circuits which comply with this general statement have been described in the specifications of British Pat. Nos. 1120541 and 1253031 in the name of Ray Milton Dolby, corresponding to present U.S. applications Ser. Nos. 397,159 and 395,562, respectively, filed as continuation applications of previously filed applications on Sept. 13, 1973 and Sept. 10, 1973, respectively, two general classes of circuits being assigned the designations Type 1 and Type 2 in specification 1253031 (U.S. Ser. No. 395,562), these designations being used hereinafter.

As will be explained below the present invention provides two further general classes of circuits, which will be called Type 3 and Type 4.

The background to the present invention, and the invention itself, will be further explained with reference to the accompanying drawings, in which:

FIGS. 1(a), 1(b), 2(a) and 2(b) are general block diagrams of Type 1 and Type 2 circuits respectively, FIGS. 3(a) and 3(b) represent the characteristics of a limiter, FIGS. 4(a) and 4(b) represent the characteristics of a circuit referred to as a conveyor in this specification, FIGS. 5(a), 5(b), 6(a) and 6(b) are general block diagrams of Type 3 and Type 4 circuits respectively, FIGS. 7(a) and 7(b) represent the transfer characteristics of Type 3 and 4 circuits, FIGS. 8 and 8(a) show a known circuit acting as a Type 3 expander, FIGS. 9 to 12 show Type 3 and 4 circuits switchable between compressor and expander configurations, FIG. 13 shows a syllabic (non-distorting) type of conveyor, FIG. 14 is a circuit diagram of a Type 3 compressor employing a syllabic conveyor, FIG. 15 is a circuit diagram of a Type 3 compressor providing independent action in two frequency bands, FIG. 16 is a circuit diagram of a Type 3 compressor providing compressor action in a band which narrows to exclude high level signals from the compressor action, FIGS. 16(a) and 16(b) show explanatory frequency response curves relating to FIG. 16,

Figure 23A:
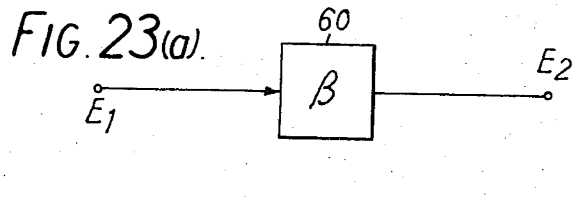
Figure 23B:
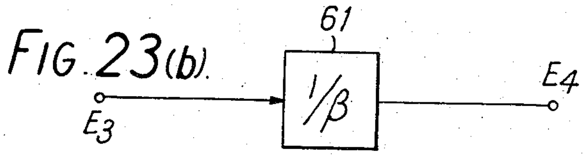
Figure 24:
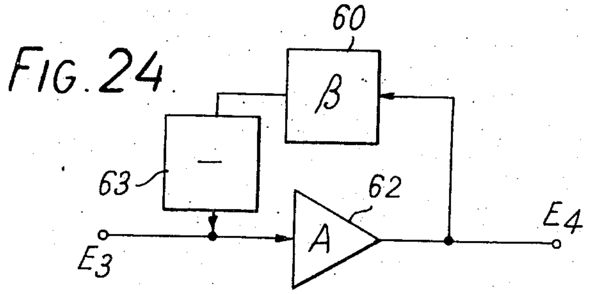
Figure 25:
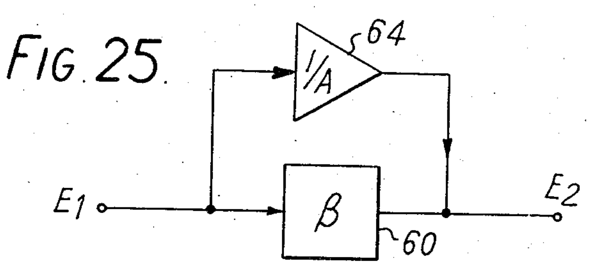

FIGS. 23(a) and (b) show two complementary networks,

FIG. 24 shows the known practical realization of the network of FIG. 23(b), and FIG. 25 shows a modified form of FIG. 23(a) enabling true complementarity to be more readily achieved.

To simplify presentation of the invention, the convention is adopted in all block diagrams that, wherever signals are combined they are combined, (i.e. mixed) additively (by blocks denoted "+") and inverters are shown (by blocks dentoed "−") when subtractive combination is required. It will be appreciated that the same overall result may be achieved in various ways with inverters in places other than those shown and/or with the use of combining circuits such as differential amplifiers which actually do subtract one signal from the other. It is merely necessary that closed loops illustrated as inverting should, overall, remain inverting; that non-inverting loops should, overall, remain non-inverting; and that the results of combining signals should remain additive or subtractive, as the case may be.

It should be understood that amplifiers and/or attenuators, generally not shown, may be used wherever necessary to establish suitable signal levels or impedance matching conditions. It is necessary, however, that suitable relative signal levels are established at the combining means in the main path to create the required compressor or expander action.

In each of FIGS. 1, 2, 5 and 6 a compressor is shown at (a) and an expander at (b), the compressor feeding the expander via an information channel represented by a broken connection with the symbol N which signifies the noise introduced in the information channel and reduced by the action of the expander. The term "information channel" is used to denote either a transmission channel feeding the encoded signal from the compressor to the expander in real time, or a record/-playback system.

Figures 1A, 1B:
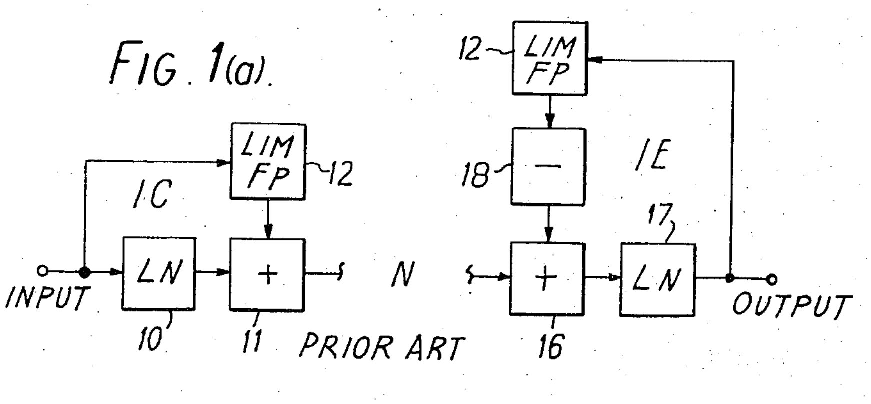

In the Type 1 compressor 1C of FIG. 1(a) the main path is constituted by a linear network 10 followed by a combining means 11. The linear network may introduce gain, (i.e. either amplification or attenuation corresponding to gain less than unity), or frequency response or phase changes (i.e. filters and phase shifters may be included), although the main path possesses at least dynamic range linearity and can be completely linear; in the latter case, the output signal component contributed thereby is proportional on an instantaneous basis to the input signal.

The main path signal component is boosted by the signal component from a limiting further path 12 which may contribute gain or attenuation and may be frequency selective but has the essential characteristic of limiting the further path signal component.

Figure 3A:
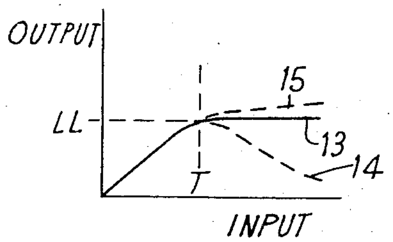
Figure 3B:
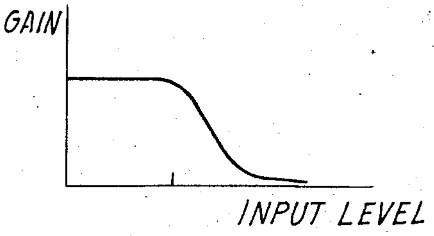

A limiter may be defined for the purposes of this application as a circuit which, below a threshold, passes a signal with dynamic range linearity and, above the threshold, passes the signal with a gain which diminishes as the input signal level rises at such a rate that the output level is prevented from rising materially above a maximum level, referred to as the limiting level. The characteristics of a limiter are illustrated in FIG. 3(a) of the accompanying drawings in which output level is plotted against input level, on a linear plot. The threshold and limiting level are indicated at T and LL respectively. Curve 13 shows one possibility in which the output level is held at the limiting level above the threshold; FIG. 3(b) shows the corresponding plot of gain versus input level. Other possibilities exist within the above definition. Thus, in FIG. 3(a) curve 14 shows the output level falling from the limiting level above the threshold and curve 15 shows the output level rising slightly above the limiting level.

In the Type 1 expander 1E of FIG. 1(b) the main path is constituted by a combining means 16 followed by a linear network 17 whose gain and phase characteristics are complementary to those of the network 10 in the compressor. The main path signal component is now bucked by the further path signal component by virtue of an inverter 18. The limiting further paths 12 in the compressor 1C and expander 1E are identical.

Figures 2A, 2B:
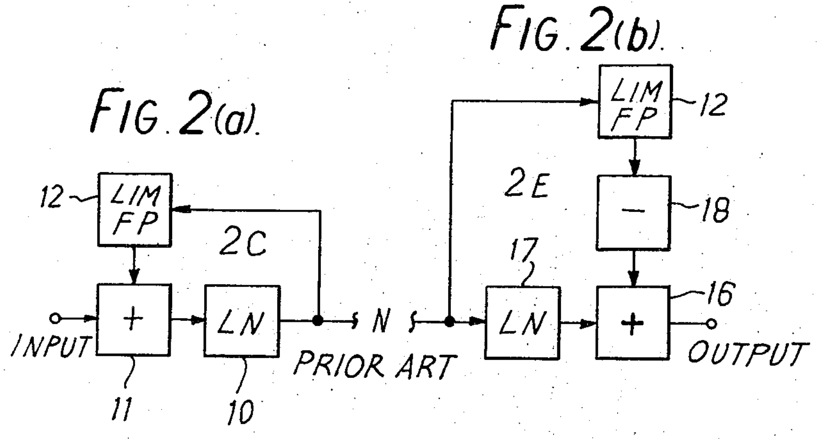

The Type 2 circuits of FIGS. 2(a) and (b) differ primarily in the points from which the further path takes its input, these being as follows:

| Circuit type | Further Path Input taken from |
|---|---|
| Type 1 compressor 1C | Main path input |
| Type 1 expander 1E | Main path output |
| Type 2 compressor 2C | Main path output |
| Type 2 expander 2E | Main path output |

In the circuits of FIGS. 1 and 2 the requirement that, in the high level region, any variations and imperfections in the parameters of the limiter shall have an insignificant influence on the transfer characteristic is met by ensuring that the limiting level LL is sufficiently low for the output of the further path not to exceed about one tenth of the output of the main path in the high level region. In other words, the action of the limiter is such that, at high signal levels, the output of the further path makes a negligible contribution to the overall output of the compressor or expander which effectively appears, at such levels, as only the main path; this, as stated above, has dynamic range linearity.

The main path can, in fact, consist of nothing more than a direct connection through the combining means although it may comprise an amplifier or an attenuator, as noted above. The further path can include an amplifier and/or attenuator preceding and/or succeeding the limiter. The paths may also include frequency response or phase equalizers. In all circumstances the considerations discussed in the preceding paragraph have to be interpreted at the point where the main path and further path components are actually combined. If a frequency selective network is utilized in the main path it can be employed to effect equalization, e.g. in an audio application.

Figure 4A:
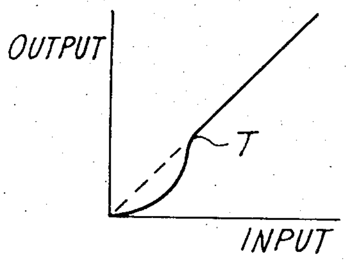
Figure 4B:
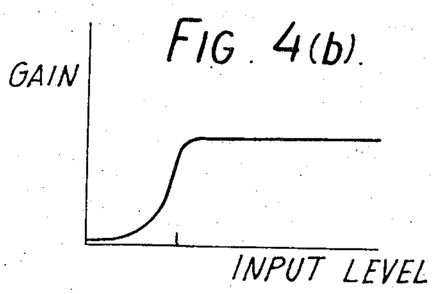
Figure 5A:
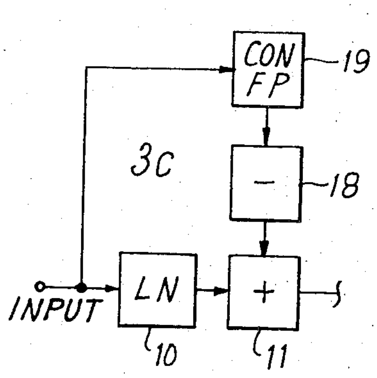
Figure 5B:
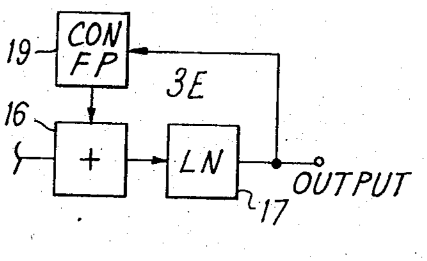
Figure 6A:
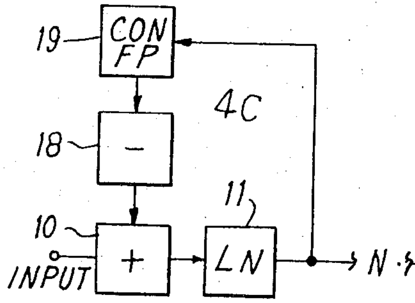
Figure 6B:
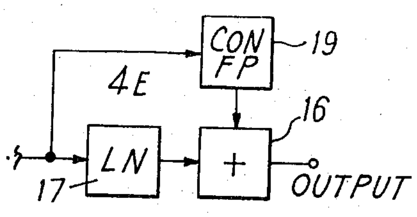

The present invention is based upon the recognition that it is possible to construct further paths whose characteristics complement those of limiting further paths and which can be used to construct compressors and expanders complying with the aforesaid general statement. It is necessary to provide a name for a circuit complementary to a limiter and it will be called a conveyor in this specification. A conveyor is defined herein as a circuit which, above a threshold, passes a signal with dynamic range linearity and, below the threshold, passes the signal with a gain which diminishes as the input signal level falls. Such circuits have been described in the art, but their significance and utility have heretofore evidently not been recognized, especially in the context of the present invention. The characteristics of a conveyor are illustrated in FIGS. 4(a) and 4(b) of the accompanying drawings, these figures corresponding to the limiter FIGS. 3(a) and 3(b) respectively and again being linear plots. The name conveyor has been chosen in that, as a limiter limits signals above a threshold, a conveyor conveys signals above a threshold. Just as a further path including a limiter may be referred to as a limiting further path or a further path having the characteristics of a limiter, a further path including a conveyor may be referred to as a conveying further path or a further path having the characteristics of a conveyor.

Given the existence of a conveying further path, whose practical realizations are discussed below, it becomes possible to construct further compressors, expanders, and noise reduction systems of two types which will be called Type 3 and Type 4. Type 3 devices are related to Type 1 devices and Type 4 devices are related to Type 2 devices, but in each case the limiter in the further path is replaced by a conveyor, and the further path component is subtracted from the main path component in the case of a compressor and is added to the main path component in the case of an expander.

The essential features of these new devices are illustrated in FIGS. 5 and 6 of the accompanying drawings as follows:

FIG. 5(*a*): Type 3 compressor, denoted 3C
FIG. 5(*b*): Type 3 expander, denoted 3E FIG. 6(*a*): Type 4 compressor, denoted 4C FIG. 6(*b*): Type 4 expander, denoted 4E In these Figures the block 19 is the conveying further path. Other circuit components are referenced in the same way as in FIGS. 1 and 2.

Figures 7A, 7B, 8, 8A:
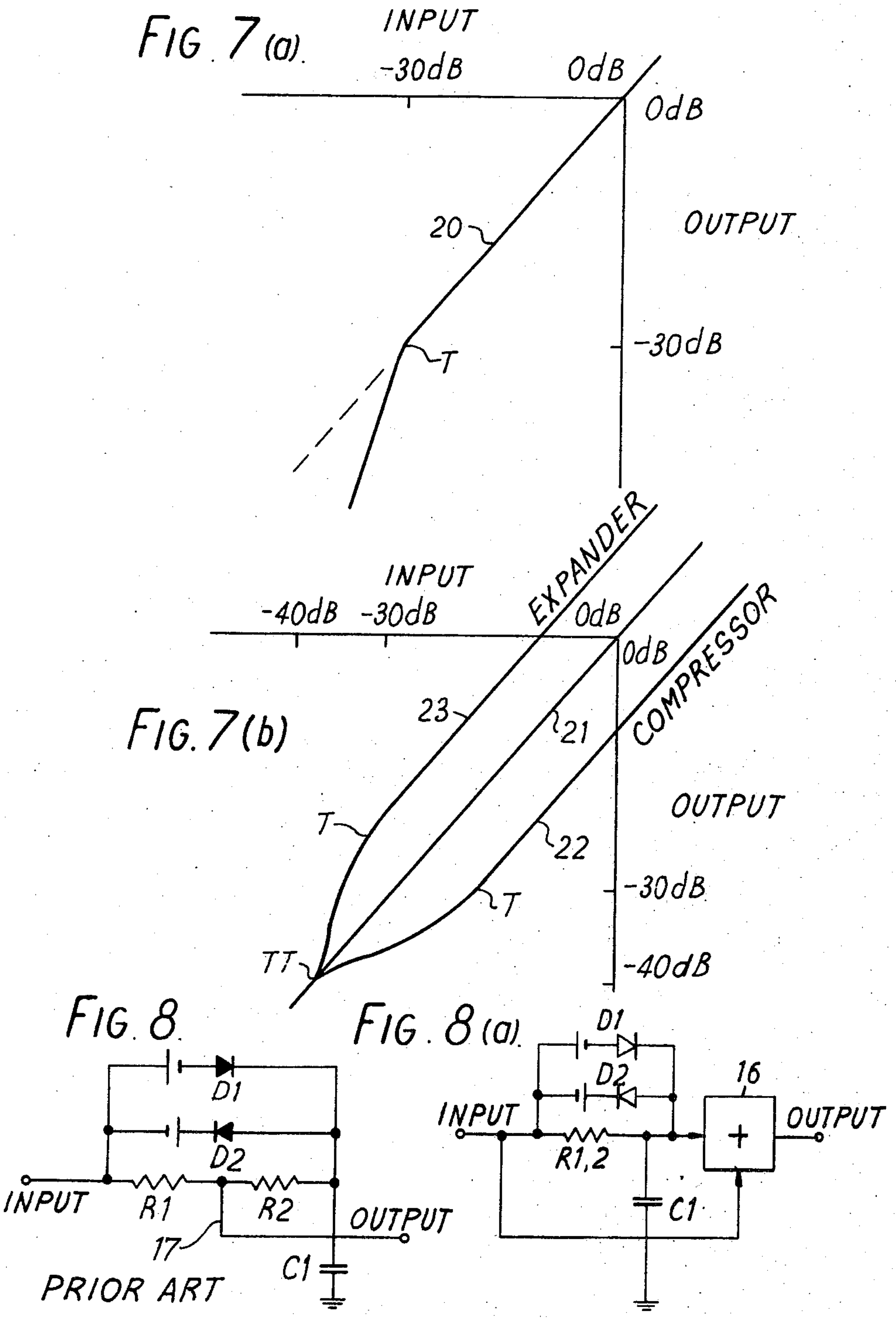

The characteristic 20 of the conveying further path 19 is illustrated in FIG. 7(a) with the threshold thereof denoted T. The characteristic of the main path is represented by line 21 in FIG. 7(b). The effect of subtracting characteristic 20 from characteristic 21 is to create the compressor characteristic 22 in which point T corresponds to the threshold T of FIG. 7(a) and the compressor threshold TT corresponds to the point at which the output of the conveying means has fallen to a negligible value, e.g. −65 dB. Likewise, the effect of adding characteristic 20 to characteristic 21 is to create the expander characteristic 23.

It is convenient to explain here that a circuit is described in the aforementioned specification No. 1,253,031 which is illustrated in FIG. 8 of the accompanying drawings. This circuit was regarded (and so described in the said specification) as a simplified Type 2 expander; with the benefit of hindsight it is now recognized that the circuit is actually a Type 4 expander in which the main path is through the resistor R1 (FIG. 8). The further path comprises a conveyor through the diodes D1 and D2 and a low pass filter, which is constituted by the resistors R1 and R2, capacitor C1 and the diodes D1 and D2. The adding means is provided by the junction between R1 and R2.

The circuit of FIG. 8 is easier to understand if it is redrawn as in FIG. 8(a) with the resistors R1 and R2 replaced by a single resistor R1, 2. The main path is represented by a direct connection 17, corresponding to the network 17 in FIG. 6(b), with the combining means 16 which adds the input signal and the conveying means output signal at the top end of C1. The main and further paths are thus readily identifiable in FIG. 8(a). The circuit simplification to FIG. 8 is possible because the effect of the combining circuit 16 can be achieved by splitting R1, 2 into two resistors R1 and R2 and connecting the output to the junction of the resistors. The sum of the values of the resistors is equal to the value R1, 2 required to establish correctly the cut-off frequency of the low-pass filter. The ratio of R1 and R2 determines the ratio in which the main path and further path components combine.

The action of the circuit can be understood most readily from FIG. 8(a). The main path component is boosted by the further path component only in the pass band of the low-pass filter. Within the pass band, such boosting is independent of signal level. Thus, there is no expansion of dynamic range within the pass band of the filter. It will be noted that the filter is in parallel with the conveying diodes. The reason for this is more fully explained below.

Consider a frequency somewhat above the normal or quiescent cut-off frequency of the filter. At this frequency there is no boost at low levels. At high levels however, the diodes D1 and D2 conduct and the reduced series resistance raises the cut-off frequency of the filter to include the said frequency in the pass band. Thus, the boosting action takes place at this frequency. Because the boosting action is absent at low levels but present at high levels, expander action is created in accordance with FIG. 7(b).

The filtering and conveying means of FIG. 8 can also be used in Type 4 compressors and Type 3 compressors and expanders, as well as in complete noise reduction systems. Video applications are particularly relevant for such circuits. To accommodate colour sub-carriers, C1 may be replaced by a parallel resonant network; for composite signals such a network may be placed in series with C1.

The conveyor in the circuit just discussed consists simply of a pair of back-to-back diodes and is thus an instantaneous conveyor. This conveyor can also be regarded as a variable coupling means, as described in British Pat. application No. 7958/72. Conveyors can however, take various other forms including circuits in which an impedance element is so controlled in response to the level of a signal in the compressor or expander as to create the conveyor action. Such circuits can be quite complex and can comprise a plurality of signal paths in parallel; so long as the overall action of the circuit is in accordance with the foregoing definition the circuit is, for the purposes of this application, a conveyor. The circuits described in British Pat. applications 7958/72 (variable coupling means) and 7959/72 (variable combining means) are circuits which can be arranged to act as conveyors. The circuits of these applications have first and second paths and, as described in the aforementioned applications, the two paths are used in combination to establish a compressor or expander action. However, by modifying the relative actions of the two paths, quantitatively rather than qualitatively, the combined action of the paths can be used to create a conveyor action such that, above a low threshold, the circuit has a linear dynamic characteristic. Therefore, a circuit as described in either of the two aforesaid applications can be used as a conveyor in the further path of a Type 3 or Type 4 compressor or expander, both the first and second paths of the circuit being within the further path of the compressor or expander. The use of variable combining means will be further described below in relation to FIG. 22.

Variable combining means can be used to provide selective connections to various signal points in the further path or paths. For example, the variable combining means may provide an automatic variable selection of the input to or the output from a filter in the further path.

Variable coupling means are used in a similar way, except that the variable coupling provides a frequency selective action which results from the variable coupling and not only from fixed filters. The variable coupling means may, for example, comprise an automatically variable impedance across a filter in the further path; the input to and the output from the filter are thus variably coupled, which results in overall alterations of the frequency response characteristic.

Figure 9:
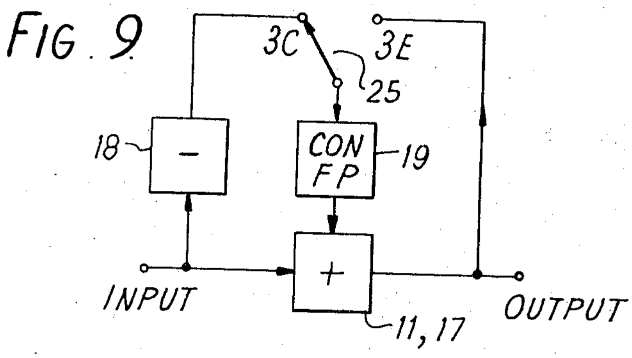
Figure 10:
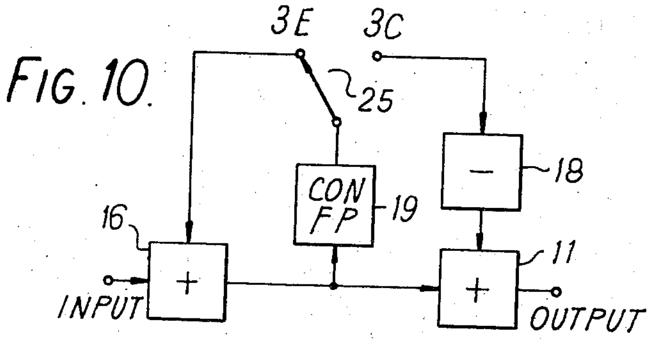
Figure 11:
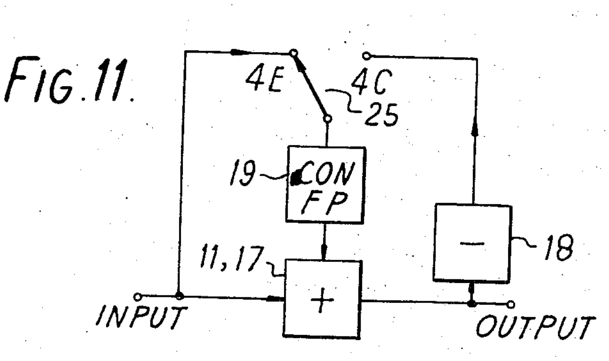
Figure 12:
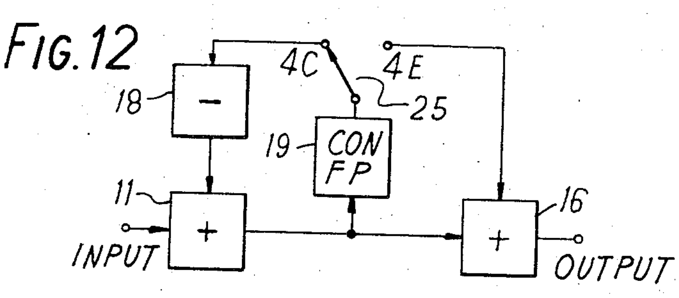

FIGS. 9 to 12 show schemes for switching Type 3 and Type 4 circuits between compressor and expander configurations. In each case the switching is effected by a changeover switch 25 whose two settings are labelled 3C and 3E or 4C and 4E to denote the type of compressor or expander action created. FIGS. 9 and 11 show switching on the input side of the further path 19 for Type 3 and Type 4 circuits respectively. FIGS. 10 and 12 show switching on the output side of the further path 19 for Type 3 and Type 4 circuits respectively.

These switchable circuits are important for effecting noise reduction in a recording/playback procedure, the compressor configuration being employed to encode the signal prior to recording and the expander configuration being employed to decode the signal recovered on playback.

In general, a complete noise reduction system comprises the combination of a Type 3 compressor and a Type 3 expander or the combination of a Type 4 compressor and a Type 4 expander. Provided that the characteristics of the main and further paths are the same in the compressor and expander, the expander action is inherently complementary to the compressor action, whereby the original information signal is recovered unchanged after encoding by the compressor and then decoding by the expander. If the information channel is a record/playback system, the compressor and expander can comprise the same processing circuitry with switching arrangements as in FIGS. 9 to 12.

There are, nevertheless, circumstances in which it is desired merely to compress or expand the dynamic range of a signal; Type 3 and 4 compressors and expanders can be utilized independently of each other for such purposes.

In Type 3 and Type 4 devices, the difference between or the sum of the main path component and the further path component will be seen to create an overall compressor or expander action. Above the threshold, the output of the compressor or expander consists of the difference or sum respectively of two components, both of which possess dynamic range linearity. It follows that the output of the compressor or expander is linear above the threshold.

In noise reduction systems it is usually sufficient to treat only the low level portion of the dynamic range — e.g. levels less than −20 dB, −40 dB, or even −60 dB with respect to the nominal maximum operating level (one, two or three orders of magnitude less). Any distortions introduced by operation of the conveying means in the region between T and TT in FIG. 7(*b*) are therefore confined to comparatively low levels, at which they are unobtrusive.

If compressors and complementary expanders are to be used in noise reduction systems it is important that signal modulated noise effects should be avoided. This is best achieved by ensuring that the various portions of the frequency spectrum are compressed or expanded as independently of each other as possible. Thus, the degree of compression or expansion (i.e. the noise reduction) obtained at the extreme high audio frequencies, for example, should be influenced as little as possible by the signal levels at low and mid frequencies.

To this end the further path can include a filter, to restrict the signal component passed by the further path to a particular part of the overall frequency band (referred to in the foregoing general statement as the specified frequency band).

For example, in an audio application, the turnover frequency at low signal levels can be placed at around 3 KHz and the boost can be 10 dB (at −40 dB or less). Such a compressor used in conjunction with a complementary expander can then provide a high frequency noise reduction of 10 dB. Also, as explained in the specifications mentioned above, a plurality of further paths in parallel can be used.

If the signal to be handled is a carrier frequency, then the compressor is suitably adapted to deal with the carrier and its sidebands. This will usually involve an automatic narrowing and widening of the frequency band on a symmetrical basis, although it is possible for the bandwidth control to be asymmetrical to suit single sideband or vestigial side band carrier signals. Trap circuits may be employed to exclude carrier frequencies which would otherwise choke the action of the compressor or expander.

The aforementioned specifications also described the use of frequency selective circuits which restrict the compressor or expander action to restricted portions of the overall band. When a high level component appears at any frequency within the restricted band, the circuit adapts itself and causes the restricted band to narrow to preclude compressor or expander action on the said frequency, at which frequency the normal characteristic provided by the main path thereby obtains. The modified (i.e. compressed or expanded) characteristic still applies for the low level signals within the narrowed restricted band, whereby compressor or expander action, and hence noise reduction, is still effected within this narrowed band. This may be referred to as the narrowing band principle since the restricted band undergoes a narrowing action to confine compression, expansion and noise reduction to frequencies where only low level signal components are present. By this method a high degree of compression and expansion can be maintained at frequencies removed from the high-level signal frequency, with consequent good noise reduction and avoidance of signal modulated noise effects.

In the application of this principle to Type 1 and Type 2 devices the pass band of the filter creates the limiter characteristic below the threshold, FIG. 3(*a*), whereas the stop band of the filter creates the characteristic above the threshold and the pass band therefore has to narrow if the signal at a frequency within the pass band exceeds the threshold. A complementary principle can be applied to Type 3 and Type 4 devices but it will be appreciated, in particular from the description of the operation of FIG. 8(*a*), that it is the stop band of the filter which must create the conveyor characteristic below the threshold, FIG. 4(*a*), whereas the pass band of the filter must create the characteristic above the threshold. Therefore in the case of Type 3 and 4 devices, although very similar circuits to those described in the aforementioned specifications can be employed, it will be understood that it is now the stop band which must be narrowed to put a frequency at which the threshold is exceeded into the pass band; in other words the Type 3 and 4 devices require the pass band to be broadened where the Type 1 and 2 devices require the pass band to be narrowed.

Figure 13:
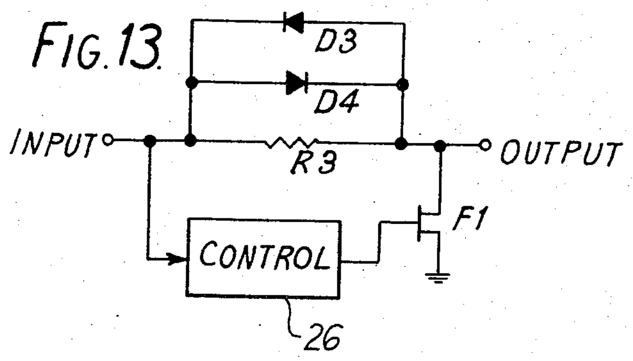

As will be apparent from FIG. 8, this invention can be embodied in various types of instantaneous, or at least non-linear, compressors and expanders which compress and expand the dynamic range of individual waveforms of the signal being processed. Such devices are useful in processing video and other signals in which phase is preserved. However, the invention can also be embodied in linear devices (referred to as syllabic devices in telecommunications) which do not distort individual waveforms. The word "linear" in this context refers only to the linear treatment of individual waveforms. On a long time scale the further path possesses the non-linearity illustrated in FIG. 4(*a*) or FIG. 7(*a*). To this end the conveying means is arranged to respond with a suitable time constant to the level of a signal (or differences of levels) in the compressor or expander. One very simple conveyor circuit for achieving this result is illustrated in FIG. 13 of the accompanying drawings.

A resistor R3 is connected between an input terminal and an output terminal which is also connected to ground through an FET F1. A control circuit 26 derives a control signal from the input of the conveyor by rectifying, amplifying if need be, and smoothing the input signal with the required time constant. The polarity of the control signal and the type of FET are so chosen that, as the input signal rises, the FET is rendered progressively less conductive, being completely cut off once the threshold T of FIG. 4(a) is reached. Above the threshold the conveyor is therefore linear. Below the threshold the circuit acts as an attenuator with a degree of sttenuation which increases as the signal level falls. This circuit may therefore be used as the conveying further path 19 in any of FIGS. 5, 6, 9, 10, 11 and 12.

Figure 14:
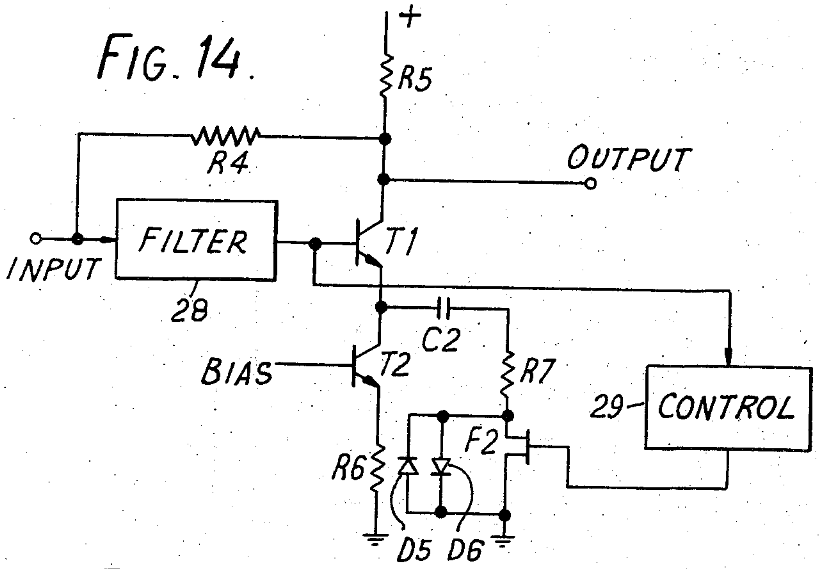

FIG. 14 of the accompanying drawings shows another possibility, this being the complete circuit of a Type 3 compressor. The main path is constituted by a resistor R4. The further path includes a filter 28 the pass band of which defines the band within which the compressor operates. The filter is in series with the conveyor. The further path component is subtracted from the main path component by a transistor T1 and its collector load resistor R5. The transistor T1 with its emitter load circuit acts as the conveyor; the emitter load circuit is constituted by a transistor T2 with emitter resistor R6 and a fixed base bias and by the parallel connection therewith, via a coupling capacitor C2, of a resistor R7 and a field effect transistor F2. The conduction of this FET is controlled by a control circuit 29 having the functions of the circuit 26 of FIG. 13 except that it is now arranged that, as the signal level at the output of the filter increases, the FET becomes more conductive, being fully conductive once the threshold is reached.

Consider firstly the situation at very low levels and within the pass band of th filter 28. The FET F2 presents a very high impedance and the emitter current of T1 is determined entirely by T2. This current is arranged to be substantially constant by virtue of the high collecotr impedance of T2, whereby T1 provides little or no gain and the further path component is attenuated. Consider now the situation when the threshold has been reached. F2 is fully conductive and presents an impedance of around 100 ohms. R5 and R7 may be some tens of thousands of ohms but are still small compared with the effective impedance of T2 and R6. The gain of the further path component is now substantially higher and is determined effectively by the ratio of R5 and R7; the impedance of F2 can be ignored in relation to R7. Therefore, above the threshold, the conveyor acts with dynamic range linearity.

Within the pass band of the filter the further path component, which is subtracted from the main path component, is attenuated at low levels but not at high levels. Therefore, the dynamic range of the output signal is compressed. Within the stop band of the filter the further path component is not attenuated at low levels and no compressor action is created. However, in the configuration of this example, in which the filter and conveyor are in series, the overall effect is to superimpose an equalization characteristic on the compressor output; the output at high levels will be greater in the pass band frequency range.

The high level characteristics of the circuit of FIG. 14 are not dependent upon the precise characteristics of F2. This illustrates an important property of Type 3 and 4 compressors and expanders in that it is possible with solid state techniques, particularly employing FET's or integrated circuits, now available to construct conveyors, and also subtracting and adding networks, whose characteristics are determined outside transition regions by fixed circuit components. It is therefore possible to achieve stability and reproducibility of performance independently of variations in the parameters of semiconductor devices occurring from batch to batch or with temperature or time.

On the question of stability, the gain of the further path in Type 2 devices must be less than unity; this applies also to Type 3 devices. Given this simple requirement these compressor or expanders are inherently stable.

The input to the control circuit 26 or 29 can be derived from a number of places in the device. The points chosen in FIGS. 13 and 14 are desirable in order to achieve stable operation. The smoothing can be effected by a two-stage integration network, making it possible to keep the attack time of the system short while at the same time keeping signal distortion and generation of modulation products to a minimum. The first stage should have a short time constant. The second stage, having a longer time constant, is coupled to the first stage in a non-linear fashion, such as by a diode-resistor combination, whereby under relatively uniform signal conditions the second stage is able to provide additional smoothing. However, for large, abrupt changes in signal amplitude the non-linear network conducts and causes the time constant of the second network to be reduced.

During the attack period overshoots or undershoots may be produced. It is possible to limit these to a low amplitude by the use of appropriately connected non-linear elements such as diodes. The use of such diodes is illustrated in FIGS. 13 and 14. In FIG. 13 diodes D3 and D4 conduct when the signal level rises abruptly and so avoid the undershoot in the signal passed by the conveyor which would otherwise occur in the finite time taken for the conduction of the FET F1 to drop. In FIG. 14 diodes D5 and D6 conduct when the signal level rises abruptly and so prevent overshoot arising in the finite time taken for FET F2 to become conductive.

Both compressors and expanders of the invention have been separately described herein, but it is also possible to effect a change of mode by the use of negative feedback amplifiers, a compressor or expander being put into the feedback loop to produce expander or compressor action respectively.

In Type 3 and 4 devices, close attention must be given to the effects of filters in either path since the output at high levels is formed by the difference between or sum of two filter outputs. Phase shift networks placed in either or both paths are sometimes useful, particularly for optimising the overall response characteristics of the system at various levels.

As seen in FIG. 14, one technique is to use a filter in series with the conveyor, the pass band of the filter determining the band in which compression or expansion takes place. Several parallel bands and paths may be used. It is then possible to achieve compression or expansion independently in different frequency bands.

Figure 15:
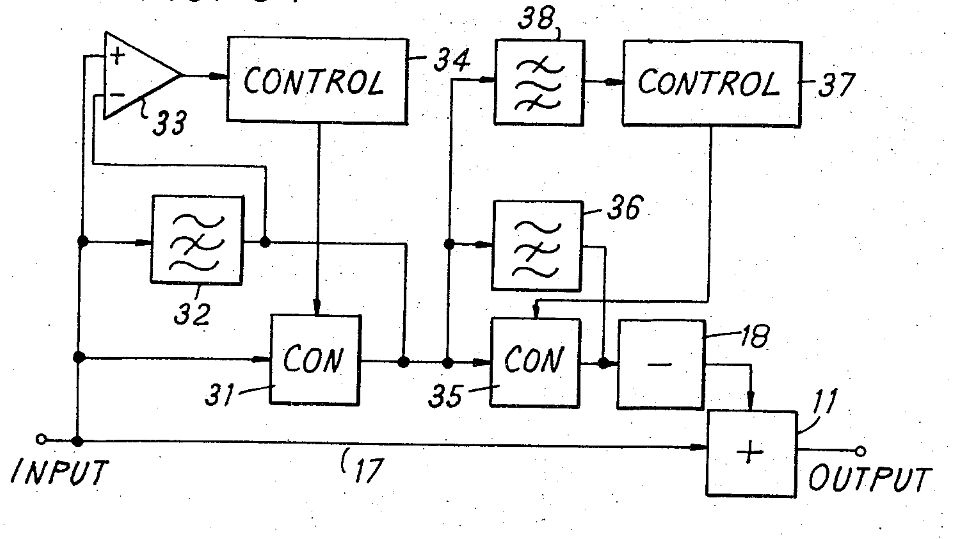

A further frequency selective technique utilizes series connected filters to which are connected variable combining or coupling means utilized as conveying means, for example, in the manner illustrated in FIG. 15. The conveying means eliminates the compression or expansion action by by-passing the filter or changing its characteristics so as to transmit the signal at high levels.

In FIG. 15 the main path is constituted by a direct connection 17 and the combining means 11. A first further path section comprises a controlled conveying means 31 connected to a band stop filter 32. The signal developed across the band stop filter is detected by a differential amplifier 33 and applied to a control circuit 34, which rectifies and smooths the signal to derive the control signal which causes the conveying means 31 to convey the signal in the stop band as the signal level in the stop band rises.

The first further path section is followed by a second section comprising a controlled conveying means 35, band stop filter 36 and control circuit 37. As an alternative to the differential amplifier 33, the second section has a band pass filter 38 which selects the frequency region excluded by the band stop filter 36.

Figure 16:
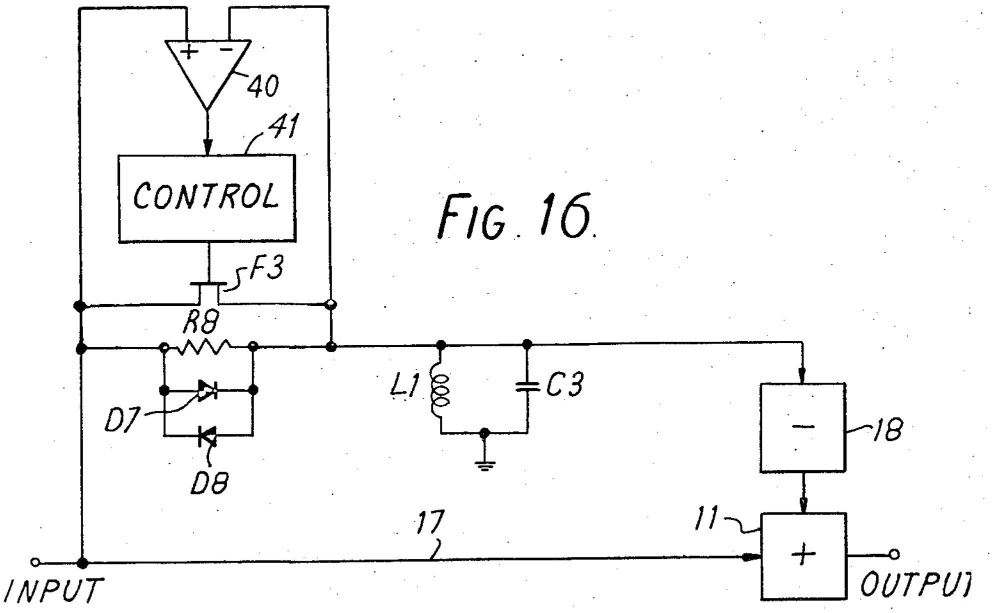

Similar considerations apply to the narrowing band Type 3 compressor shown in FIG. 16. The conveying means here is a variable coupling means which consists of an FET F3 connected across a tuned band pass filter formed by a series resistance R8 and a shunt arm comprising an inductor L1 and a capacitor C3 in parallel. R8 is also shunted by back to back diodes D7 and D8 for eliminating overshoots. The signal in the stop band of the filter is detected by a differential amplifier 40 connected across R8 and is rectified and smoothed by a control circuit 41 to derive a control signal which increases the conduction of F3 as the level of the signal in the stop bands increases.

Figure 16A:
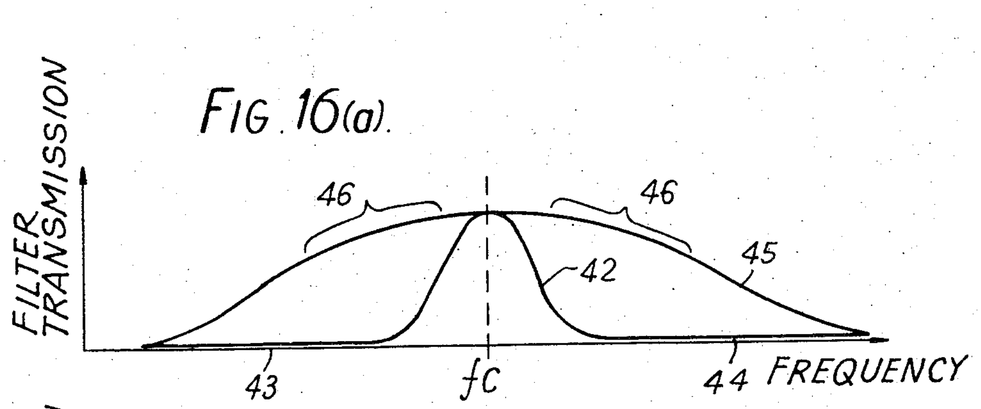

When F3 has a high impedance, R2, L1 and C3 create a relatively narrow pass band shown at response curve 42 in FIG. 16(a). This pass band can be centred on a carrier frequency fc whereby the carrier signal and its inner side-bands are permanently excluded from compressor action because they are always passed by the filter to the inverter 18 and combining means 11. In the stop bands 43 and 44 however, low-level signals are prevented from passing through the further path. If the level of outer side-bands of the carrier signal increases, the control signal reduces the resistance of F3, thereby decreasing the series resistance of the filter and broadening the pass band, e.g. as shown at 45 in FIG. 16(a). Signals within the broadened pass band 45 are now excluded from the compressor action. However, the different treatment of signals within the frequency regions 46 when the low level characteristic 42 applies and when the high level characteristic 45 applies has the effect of establish dynamic range compression for such signals.

Figure 16B:
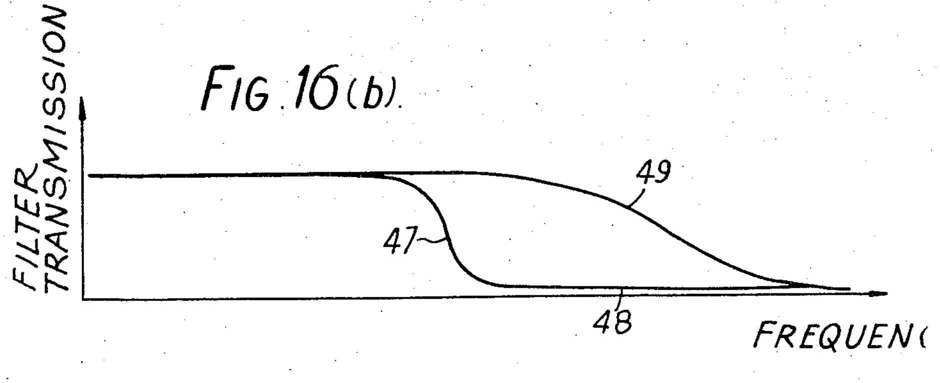

If the inductor L1 is eliminated, the tuned pass band 42 of FIG. 16(a) becomes the low pass band 47 of FIG. 16(b) which remains as such so long as there are no high level, high frequency components in the stop band 48. If such components appear, the pass band broadens to characteristic 49. Compression is confined to the high frequency stop band of the filter, because it is only in this band that low level components do not buck the main path component at the combining means 11. The converse situation in which compression is confined to a low frequency stop band can be obtained by eliminating C3 and using only R8 and L1.

Although FIGS. 14, 15 and 16 all show only Type 3 compressors, it will be apparent from FIGS. 5 and 6 how the circuits can be re-arranged to form Type 3 expanders or Type 4 compressors or expanders.

The invention is additionally concerned with modified versions of Type 1, 2, 3 and 4 devices in which a conveying means is utilized to construct a limiter or filter/limiter (limiting means) or vice versa.

The relevant possibilities are illustrated in FIGS. 17 to 20 of the accompanying drawings, as follows:-

Figure 17:
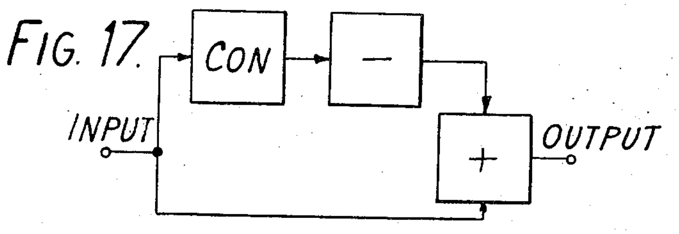
FIGS. 17 and 18 show conveyors utilized to construct limiters.

FIG. 17: conveying means connected in a forward loop to construct limiting means. The gains of the two paths must be substantially the same at high levels so that the output signal is limited, as required. This distinguishes the circuit from FIG. 5(a) in which the gains differ substantially in order to yield a high level output signal at high input levels.

Figure 18:
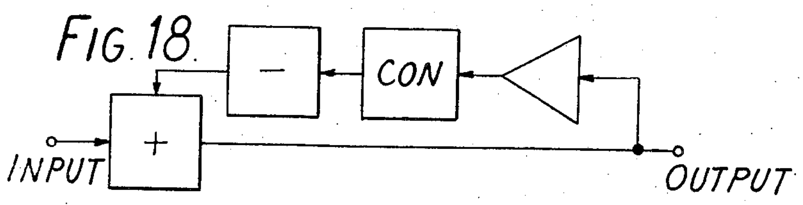

FIG. 18: conveying means connected in a feedback loop to construct limiting means. The loop gain of the negative feedback loop must be high to cause the output to be small, i.e. limited, at high levels. This distinguishes the circuit from FIG. 6(a) in which the gain must be such that the output signal is a high level signal at high input levels.

Figure 19:
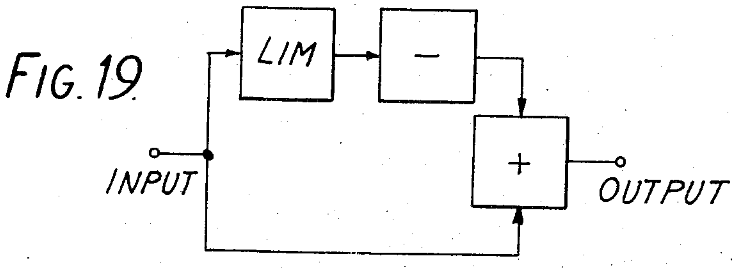
FIGS. 19 and 20 show limiters utilized to construct conveyors.

FIG. 19: limiting means connected in a forward loop to construct conveying means. The low level gains must in this case be the same to achieve cancellation at low levels. This distinguishes the circuit from FIG. 2(b) in which the further path signal bucks but certainly must not cancel the main path signal at low levels.

Figure 20:
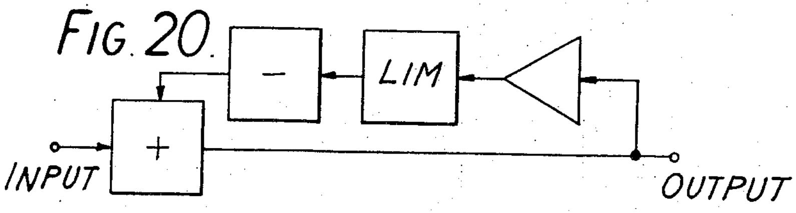

FIG. 20: limiting means connected in a feedback loop to construct conveying means. Again a high loop gain is necessary so that, at low levels below the threshold of the limiter, the output shall be negligible. This distinguishes the circuit from FIG. 1(b) in which the further path gain is such that the further path signal bucks but by no means cancels the main path signal.

In many practical situations, the configurations of FIGS. 18 and 20 are preferred to those of FIGS. 17 and 19 since the use of a negative feedback loop leads to a stable and reproducible circuit without the need for high precision components.

Another eight Type 1 and 2 circuit configurations can therefore be generated by replacing the limiting further path 12 in any one of FIGS. 1(a), 1(b), 2(a) and 2(c) by the circuit of either FIG. 17 or FIG. 18. Likewise, another eight Type 3 and 4 circuit configurations can be generated by replacing the conveying further path 19 in any one of FIGS. 5(a), 5(b), 6(a) and 6(b) by the circuit of either FIG. 19 or FIG. 20.

Figure 21:
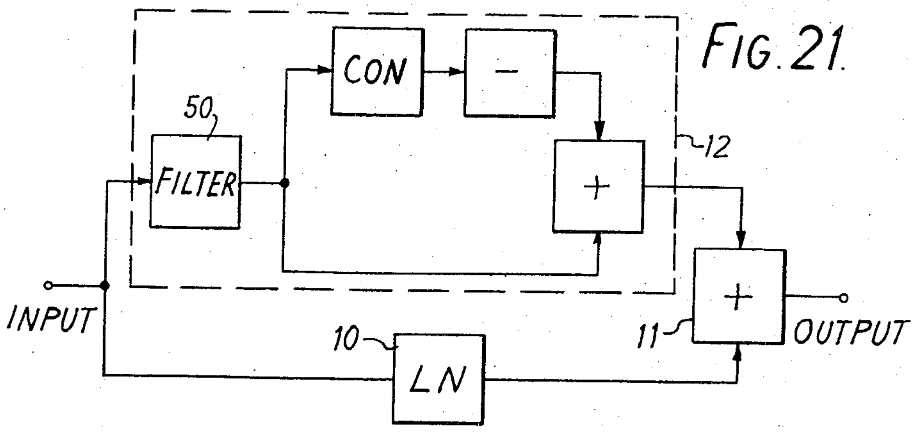
FIG. 21 shows a Type 1 compressor utilizing a limiter constructed in accordance with FIG. 17.

As one specific example, FIG. 21 of the accompanying drawings illustrates a Type 1 compressor utilizing the limiter circuit of FIG. 17. One reason for choosing this specific example is that it represents, with one fundamental difference, the circuit of a compressor described in "Auditory Perception" by Goodell and Michel, *Electronics* July, 1946, pages 142 to 148. The fundamental difference is that Goodell and Michel do not use a true conveyor as defined herein. They use a vacuum tube as a variable gain device; apart from the disadvantages which must arise from the lack of stability of the circuit characteristics, a variable gain vacuum tube has no threshold above which its gain is constant. There are three paths in parallel in FIG. 21; in the Goodell and Michel circuit one of these is non-linear at all signal levels, not being a conveyor, and it is therefore impossible to achieve overall dynamic range linearity at high signal levels. Overall dynamic range linearity is achieved in all circuits of this invention at high levels because the output of the conveyor is, like the output of the other paths, linear above the threshold.

In FIG. 21 the Type 1 compressor comprises a linear network 10, combining means 11 and limiting further path 12 as in FIG. 1(a). The limiting further path includes a filter 50 which selects the pass band within which compressor action takes place. The rest of the further path is a limiter based upon a conveyor as in FIG. 17.

Figure 22:
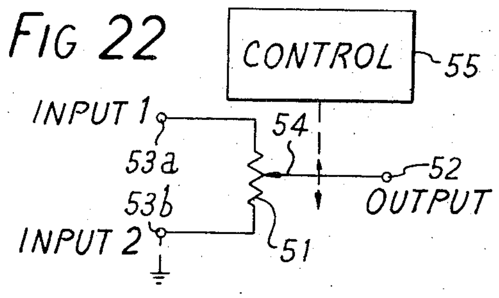
FIG. 22 shows a circuit operative either as a conveyor or a limiter.

FIG. 22 shows a circuit which relates the concepts of variable combining means, limiters, and conveyors. Depicting a variable combining means, potentiometer 51 couples to an output terminal 52 a proportion of input signals 1 and 2 at terminals 53*a* and *b* determined by the setting of the tap 54 of the potentiometer. A control unit 55 adjusts the position of the tap in dependence upon the level of a signal derived from a suitable point on the input or output side of the circuit.

Limiters and conveyors are formed when signal 2 is zero; terminal 53b may be connected to earth. If, then, the sense of potentiometer adjustment is such that the degree of signal transfer decreases above a threshold as the said signal level rises, the circuit acts as a limiter. If, conversely, the sense of adjustment is such that the degree of signal transfer decreases below a threshold as the signal level falls, the circuit acts as a conveyor.

Alternatively, the circuit of FIG. 22 may be operated as a conveyor by connecting the inputs 1 and 2 to different points, e.g. the outputs of different filters, the adjustment of the potentiometer causing the circuit to have the characteristics of a conveyor, at least within a particular frequency band.

Although a potentiometer with an adjustable tap has been shown, it will be appreciated that the principles illustrated apply to purely electronic circuits as well.

In this invention, use has been made of particular compressor/expander configurations which ensure theoretically perfect reciprocity or complementarity of the compressor and expander when used together in a noise reduction system. Such configurations are shown in FIGS. 1, 2, 5 and 6.

Various explanations and analyses of the complementarity mechanism have been given in the present and previous patent specifications. A new interpretation and analysis, providing even greater applicability for the concepts involved, is now given.

Referring to FIG. 23(a), a network 60 with a transfer function or characteristic $\beta$, of gain, frequency response, delay, and dynamic range (linearity vs non-linearity), is shown at (a). The network 61 of FIG. 23(b), with reciprocal characteristics $1/\beta$, may precede or follow the network of FIG. 23(a) in a complete transmission channel. Such networks may, for example, be used as complementary equalizers. If non-linear in operation, they may be used as compressor/expanders, whether on an instantaneous or syllabic basis.

Given a network with characteristics $\beta$, it is often difficult or impractical to construct a network with characteristics $1/\beta$. Therefore, a convenient and frequently used technique of generating the required characteristic is to place a network with characteristic $\beta$ in the negative feedback loop of a high gain amplifier 62, as illustrated in FIG. 24. Conventional feedback amplifier notation has been adopted, but for the present purposes it is convenient to represent the signal polarity situation by the inverting network 63; the signal combination at the input of the amplifier 62 is additive. Both A and $\beta$ may be complex, and $\beta$ may be non-linear.

a. In FIG. 23(a) $E_2 = \beta E_1$ b. In FIG. 24 $E_4 = AE_3 - A\beta E_4$. Rearranging, $$E_4 = \frac{E_3}{\beta + \frac{1}{A}}$$

With (a) and (b) in tandem, say $E_2 = E_3$ (the signal in the transmission channel). Then $$\frac{E_4}{E_1} = \frac{\beta}{\beta + \frac{1}{A}} \quad (1)$$

Thus $E_4 \rightarrow E_1$ if $A \rightarrow \infty$

For a reciprocity error not to exceed 1 percent, the product $A\beta$ must be at least 100. Unfortunately, if the network $\beta$ is at all complex it may be difficult to make the feedback loop stable. Therefore, it is useful to have a method which reduces the gain requirement and eases the stability problem.

An inspection of Equation (1) shows that the high gain requirement would be eliminated if the numerator were to have an additional term 1/A to complement that in the denominator. Since the numerator $\eta$ represents the transfer function of the network 60, the term 1/A represents a compensation or correction component which must be taken from the input $E_1$ and transferred to the output $E_2$ by a transfer function 1/A, provided by an amplifier 64. This situation is depicted in FIG. 25. If A is not too low (say 10), then the correction component will be relatively small (say 10 percent of the signal from the network $\beta$). The output of the network thus usually provides the majority of the signal $E_2$, even at high levels. This is in contrast with previously described, but analogous in configuration Type 1 devices, using limiting further paths, in which the contribution of the linear path greatly exceeds that of the non-linear path. However, there may be applications in which it is desired to construct a conventional high level expander from a conventional high level compressor, or vice versa, using negative feedback amplifiers. The principles of the reciprocity correction scheme may then be used, with the Type 1 configuration, but without the usual low level limiting requirement normally associated with Type 1 devices; this is equivalent to the Type 4 configuration, but with compressor and expander reversed.

Equivalent reciprocity correction schemes using positive, instead of negative, feedback amplifiers may also be employed, the inverting means 63 being removed from the amplifier loop in FIG. 24 and inverting means being inserted in the correction signal path in FIG. 25. The configurations produced are analogous to the Type 2 and Type 3 devices discussed previously.

In these reciprocity correction schemes a correction signal which is not small may change the overall effective characteristic $\beta$ of the network 60 (i.e. of the signal $E_2$). In such instances it may be necessary to modify $\beta$ to $\beta^1$, such that $\beta^1$ and the correction signal then yield the desired overall result (as if the characteristic of the network had been $\beta$ without any correction).

One application of such reciprocity correction schemes is to the series mode types of compressors and expanders described in British Pat. application No. 6747/71 corresponding to present U.S. application Ser. No. 232,113, filed Mar. 6, 1972. Such circuits, in particular the compressors, can be utilized as the network 60 in FIGS. 24 and 25.

I claim:

1. A signal compressor, comprising a main signal path including a combining means and extending from an input terminal to an output terminal for transferring to the output terminal a main signal component whose dynamic range is linear with respect to the dynamic range of an input signal applied to the input terminal, and a further path having an input connected to the input terminal and an output connected to the combining means for combining with the main signal component, so as to buck the level of the main signal component, a further signal component, the further path including circuit means having the characteristics of a conveyor such that, above a predetermined threshold, the dynamic range of the further signal component is linear with respect to the dynamic range of the signal at the input to the further path, and, below the threshold, the gain of the further signal component relative to the signal at the input to the further path falls as the level of the last said signal falls.

2. A signal compressor according to claim 1, comprising a filter in parallel with said circuit means, said circuit means being connected directly to elements of the filter so that the impedance of said circuit means influences the characteristics of the filter and at least one stop band of the filter narrows as the level of the signal at the input to the further path rises and said impedance falls.

3. A signal expander, comprising a main signal path including a combining means and extending from an input terminal to an output terminal for transferring to the output terminal a main signal component whose dynamic range is linear with respect to the dynamic range of an input signal applied to the input terminal, and a further path having an input connected to the output terminal and an output connected to the combining means for combining with the main signal component, so as to boost the level of the main signal component, a further signal component, the further path including circuit means having the characteristics of a conveyor such that, above a predetermined threshold, the dynamic range of the further signal component is linear with respect to the dynamic range of the signal at the input to the further path, and, below the threshold, the gain of the further signal component relative to the signal at the input to the further path falls as the level of the last said signal falls.

4. A signal expander according to claim 3, comprising a filter in parallel with said circuit means, said circuit means being connected directly to elements of the filter so that the impedance of said circuit means influences the characteristics of the filter and at least one stop band of the filter narrows as the level of the signal at the input to the further path rises and said impedance falls.

5. A signal compressor, comprising a main signal path including a combining means and extending from an input terminal to an output terminal for transferring to the output terminal a main signal component whose dynamic range is linear with respect to the dynamic range of an input signal applied to the input terminal, and a further path having an input connected to the output terminal and an output connected to the combining means for combining with the main signal component, so as to boost the level of the main signal component, a further signal component, the further path including circuit means having the characteristics of a conveyor such that, above a predetermined threshold, the dynamic range of the further signal component is linear with respect to the dynamic range of the signal at the input to the further path, and, below the threshold, the gain of the further signal component relative to the signal at the input to the further path falls as the level of the last said signal falls.

6. A signal compressor according to claim 5, comprising a filter in parallel with said circuit means, said circuit means being connected directly to elements of the filter so that the impedance of said circuit means influences the characteristics of the filter and at least one stop band of the filter narrows as the level of the signal at the input to the further path rises and said impedance falls.

7. A noise reduction system comprising a signal compressor having an input terminal and an output terminal, a signal expander having an input terminal and an output terminal, and an information channel for transferring a signal from the compressor output terminal to the expander input terminal, each of the compressor and expander comprising a main signal path including a combining means and extending from the respective input terminal to the respective output terminal for transferring to the output terminal a main signal component whose dynamic range is linear with respect to the dynamic range of an input signal applied to the input terminal, the compressor further comprising a further path having an input connected to the compressor input terminal and an output connected to the combining means of the compressor for combining with the main signal component, so as to buck the level of the main signal component in the compressor, a further signal component, the expander further comprising a further path having an input connected to the expander output terminal and an output connected to the combining means of the expander for combining with the main signal component, so as to boost the level of the main signal component in the expander, a further signal component, each further path including circuit means having the characteristics of a conveyor such that, above a predetermined threshold, the dynamic range of the respective further signal component is linear with respect to the dynamic range of the signal at the input to the further path, and below the threshold, the gain of the further signal component relative to the signal at the input to the further path falls as the level of the last said signal falls.

8. A noise reduction system comprising a signal compressor having an input terminal and an output terminal, a signal expander having an input terminal and an output terminal, and an information channel for transferring a signal from the compressor output terminal to the expander input terminal, each of the compressor and expander comprising a main signal path including a combining means and extending from the respective input terminal to the respective output terminal for transferring to the output terminal a main signal component whose dynamic range is linear with respect to the dynamic range of an input signal applied to the input terminal, the compressor further comprising a further path having an input connected to the compressor output terminal and an output connected to the combining means of the compressor for combining with the main signal component, so as to buck the level of the main signal component in the compressor, a further signal component, the expander further comprising a further path having an input connected to the expander input terminal and an output connected to the combining means of the expander for combining with the main signal component, so as to boost the level of the main signal component in the expander, a further signal component, each further path including circuit means having the characteristics of a conveyor such that, above a predetermined threshold, the dynamic range of the respective further signal component is linear with respect to the dynamic range of the signal at the input to the further path, and below the threshold, the gain of the further signal component relative to the signal at the input to the further path falls as the level of the last said signal falls.

9. A circuit switchable between the configurations of a signal compressor and a signal expander, comprising a main signal path including a combining means and extending from an input terminal to an output terminal for transferring to the output terminal a main signal component whose dynamic range is linear with respect to the dynamic range of an input signal applied to the input terminal, a further path having an input and an output for providing a further signal component at said output, and switching means having a compressor setting and an expander setting, the switching means establishing in the compressor setting a first loop from a point in the main path, through the further path, to the combining means such that the further signal component bucks the main signal component, and the switching means establishing in the expander setting a second loop from a point in the main path, through the further path, to the combining means such that the further signal component boosts the main signal component, the point in the main path to which the input of the further path is connected being on opposite sides of the point in the main path at which the further signal component is combined with the main signal component in the compressor and expander settings respectively, the further path including circuit means having the characteristics of a conveyor such that, above a predetermined threshold, the dynamic range of the further signal component is linear with respect to the dynamic range of the signal at the input to the further path, and, below the threshold, the gain of the further signal component relative to the signal at the input to the further path falls as the level of the last said signal falls.

10. A circuit according to claim 9, wherein the main path includes a single combining means to which the output of the further path is permanently connected, and wherein the switching means connect the input to the further path to a first point in the main path preceding the single combining means in the compressor setting and connect the input to the further path to a second point in the main path following the single combining means in the expander setting.

11. A circuit according to claim 9, wherein the main path includes first followed by second combining means, the input to the further path is permanently connected to a point between the first and second combining means, and wherein the switching means connect the output of the further path to the second and first combining means in the compressor and expander settings respectively.

12. A circuit according to claim 9, wherein the main path includes a single combining means to which the output of the further path is permanently connected, and wherein the switching means connect the input to the further path to a first point in the main path following the single combining means in the compressor setting and connect the input to the further path to a second pint in the main path preceding the single combining means in the expander setting.

13. A circuit according to claim 9, wherein the main path includes first followed by second combining means, the input to the further path is permanently connected to a point between the first and second combining means, and wherein the switching means connect the output of the further path to the first and second combining means in the compressor and expander settings respectively.

14. A circuit for modifying the dynamic range of a signal, comprising a main signal path including a combining means and extending from an input terminal to an output terminal for transferring to the output terminal a main signal component whose dynamic range is linear with respect to the dynamic range of an input signal applied to the input terminal, a further path having an input connected to a point in the main path and an output connected to the combining means for combining a further signal component with the main signal component, and a control circuit responsive to a signal in one of said paths to derive a smoothed control signal, the further path including controlled impedance means determining the transfer of a signal from the further path input to the further path output, the controlled impedance means being so responsive to the control signal that, above a predetermined threshold, the dynamic range of the further signal component is linear with respect to the signal at the input to the further path, and, below the threshold, the gain of the further signal component relative to the signal at the input to the further path falls as the level of the last said signal falls.

15. A circuit according to claim 14, wherein the further signal component bucks the main signal component, whereby the circuit acts as a compressor.

16. A circuit according to claim 14, wherein the further signal component boosts the main signal component, whereby the circuit acts as an expander.

17. A circuit according to claim 14, wherein the controlled impedance means lies in series between the input to and the output of the further path, and the control signal reduces the impedance of the controlled impedance means as the level of the signal at the input to the further path increases.

18. A circuit according to claim 17, wherein the controlled impedance means is shunted by limiting means arranged to conduct when the signal level at the input to the further path increases abruptly.

19. A circuit according to claim 17, wherein the controlled impedance means is shunted by a filter which excludes the dynamic range modification in one or more pass-bands thereof.

20. A circuit according to claim 19, wherein the controlled impedance means acts as part of the series arm impedance of the filter and at least one stop band of the filter narrows as the impedance of the controlled impedance means is reduced.

21. A circuit according to claim 19, wherein the control circuit derives the smoothed control signal from the voltage developed across the filter.

22. A circuit according to claim 19, wherein the control circuit comprises a second filter complementary to the first said filter connected to the input to the further path and a smoothing circuit connected to the output of the second filter.

23. A circuit according to claim 14, wherein the further path includes a series impedance means, the controlled impedance means is connected as a shunt arm to form a potential divider with the series impedance means, the further path output is coupled to the junction of the series impedance means and the controlled impedance means, and the control signal increases the impedance of the controlled impedance means as the level of the signal at the input to the further path increases.

24. A circuit according to claim 23, wherein the series impedance means is shunted by limiting means arranged to conduct when the signal level at the input to the further path increases abruptly.

25. A circuit according to claim 14, wherein the further path comprises a variable gain amplifier whose gain is determined by the controlled impedance means.

26. A circuit according to claim 25, wherein the gain of the amplifier rises as the impedance of the controlled impedance means falls and wherein the control signal reduces the impedance of the controlled impedance means as the level of the signal at the input to the further path increases.

27. A circuit according to claim 26, wherein the controlled impedance means is shunted by limiting means arranged to conduct when the signal level at the input to the further path increases abruptly.

28. A circuit according to claim 25, wherein the variable gain amplifier is shunted by a filter which excludes the dynamic range modification in one or more passbands thereof.

29. A circuit according to claim 28, wherein the control circuit derives the smoothed control signal from the voltage developed across the filter.

30. A circuit for modifying the dynamic range of a signal, comprising a main signal path including a combining means and extending from an input terminal to an output terminal for transferring to the output terminal a main signal component whose dynamic range is linear with respect to the dynamic range of an input signal applied to the input terminal, and a further path having an input connected to a point in the main path and an output connected to the combining means for combining a further signal component with the main signal component, wherein the further path comprises a plurality of circuit means connected in series, each circuit means having the characteristics of a conveyor such that, above a predetermined threshold, the dynamic range of the signal passed thereby is linear with respect to the dynamic range of the signal at the input to the circuit means, and, below the threshold, the gain of the signal passed thereby relative to the signal at the input to the circuit means falls as the level of the last said signal falls, and a plurality of filters, each shunting a respective one of the circuit means, the filters having different stop bands.

31. A circuit arrangement comprising a first circuit for processing a signal before the signal is applied to an information channel and a second circuit for reciprocally processing the signal derived from the information channel, wherein one circuit includes a processing network connected in a negative feedback loop of open loop gain A and the other circuit includes a substantially identical processing network in a first forward signal path which is in parallel with a linear, second forward signal path whose gain, relative to the said first forward path, is 1/A, the value of 1/A being such that the second forward path contributes a signal component which is small compared with that contributed by the first forward path.

32. A circuit arrangement according to claim 31, wherein the processing network is an equalizing network.

33. A circuit arrangement according to claim 31, wherein the said one and other circuits are the first and second circuits respectively, and the processing network is a signal expander.

34. A circuit arrangement according to claim 31, wherein the said one and other circuits are the second and first circuits respectively.

35. A circuit arrangement according to claim 34, wherein the processing network is a signal compressor.

36. A circuit arrangement comprising a first circuit for processing a signal before the signal is applied to an information channel and a second circuit for reciprocally processing the signal derived from the information channel, wherein one circuit includes a processing network which is linear with respect to dynamic range connected in a negative feedback loop of open loop gain A and the other circuit includes a substantially identical processing network in a first forward signal path which is in parallel with a linear, second forward signal path whose gain, relative to the said first forward path, is 1/A.

37. A circuit arrangement according to claim 36, wherein the value of 1/A is such that the second forward path contributes a signal component which is small compared with that contributed by the first forward path.

38. A circuit arrangement according to claim 36, wherein the said one and other circuits are the second and first circuits respectively.

39. A circuit arrangement according to claim 36, wherein the processing network is an equalizing network.

* * * * *